United States Patent
Butehorn et al.

(10) Patent No.: US 11,196,584 B2
(45) Date of Patent: Dec. 7, 2021

(54) NETWORK LAYER CHANNEL BONDING

(71) Applicant: HUGHES NETWORK SYSTEMS, LLC, Germantown, MD (US)

(72) Inventors: Matthew Butehorn, Mt. Airy, MD (US); Murali Regunathan, Washington, DC (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 0 days.

(21) Appl. No.: 16/792,017

(22) Filed: Feb. 14, 2020

(65) Prior Publication Data
US 2021/0258184 A1    Aug. 19, 2021

(51) Int. Cl.
| | |
|---|---|
| *H04L 12/28* | (2006.01) |
| *H04L 12/863* | (2013.01) |
| *H04L 12/26* | (2006.01) |
| *H04L 12/891* | (2013.01) |
| *H04L 29/06* | (2006.01) |

(52) U.S. Cl.
CPC ...... *H04L 12/2865* (2013.01); *H04L 43/0888* (2013.01); *H04L 47/41* (2013.01); *H04L 47/62* (2013.01); *H04L 69/22* (2013.01)

(58) Field of Classification Search
CPC . H04L 12/2865; H04L 43/0888; H04L 47/41; H04L 47/62; H04L 69/22; H04L 5/0001; H04L 12/2838; H04L 29/08477; H04L 49/3072; H04L 67/108; H04W 28/0983
See application file for complete search history.

(56) References Cited

U.S. PATENT DOCUMENTS 7,817,668 B2 * 10/2010 Igarashi ............... H04L 47/283 370/474
8,654,771 B1 * 2/2014 Singh .................... H04L 47/125 370/394

(Continued)

OTHER PUBLICATIONS

International Search Report and Written Opinion dated May 12, 2021 for International Application No. PCT/US2021/018013, filed Feb. 12, 2021.

*Primary Examiner* — Kibrom T Hailu
(74) *Attorney, Agent, or Firm* — Sheppard, Mullin, Richter & Hampton LLP (57) ABSTRACT

Implementations of the disclosure are directed to network layer channel bonding. In one implementation, a method comprises: operating a first communication device to transmit data to a second communication device over multiple communication links, each of the communication links associated with a respective communication medium; receiving, at the first communication device, an input data stream for transmission to the second communication device, the input data stream comprising packets; determining, at the first communication device, a throughput and latency of each of the communication links; based on the determined throughput and latency of each of the communication links: dividing the packets into multiple sets, each of the sets configured to be transmitted by the first communication device over a respective one of the communication links; and transmitting, from the first communication device to the second communication device, each of the sets of packets over the set's respective communication link.

17 Claims, 8 Drawing Sheets

(56) References Cited

U.S. PATENT DOCUMENTS

| | | | |
|---|---|---|---|
| 2012/0230200 A1* | 9/2012 | Wentink | H04L 1/1825 |
| | | | 370/241 |
| 2017/0012861 A1* | 1/2017 | Blumenthal | H04L 67/28 |
| 2017/0171060 A1* | 6/2017 | Liu | H04L 67/32 |
| 2017/0265190 A1* | 9/2017 | Marjelund | H04W 72/0413 |
| 2018/0205639 A1* | 7/2018 | Zakaria | H04L 65/104 |
| 2018/0254984 A1* | 9/2018 | Floyd, III | H04L 45/302 |
| 2019/0150214 A1 | 5/2019 | Zhou et al. | |
| 2020/0084671 A1* | 3/2020 | Xu | H04W 28/0268 |
| 2020/0112363 A1* | 4/2020 | Roy | H04L 69/163 |

* cited by examiner

Operating A First Communication Device To Transmit Data To A Second Communication Device Over A Plurality Of Communication Links, Each Of The Communication Links Associated With A Respective Communication Medium
502

Receiving, At The First Communication Device, An Input Data Stream For Transmission To The Second Communication Device, The Input Data Stream Comprising A Plurality Of Packets
504

Determining, At The First Communication Device, A Throughput And Latency Of Each Of The Plurality Of Communication Links
508

Based On The Determined Throughput And Latency Of Each Of The Plurality Of Communication Links: Dividing The Plurality Of Packets Into Multiple Sets Of Packets, Each Of The Sets Of Packets Configured To Be Transmitted By The First Communication Device Over A Respective One Of The Communication Links
506

Transmitting, From The First Communication Device To The Second Communication Device, Each Of The Sets Of Packets Over The Set's Respective Communication Link
508

Receive, At Each Of A Plurality Of Receivers, A Signal Including A Set Of Frames Transmitted Over A Respective Communication Medium By A Source Communication Device
552

Obtain A Plurality Of Packets By Extracting A Packet From Each Frame Of Each Of The Set Of Frames
554

Read Sequence Header For Each Of The Plurality Of Packets
556

Based On Sequence Header Read From Each Of The Packets, Reorder Packets Into A Receive Data Stream
558

NETWORK LAYER CHANNEL BONDING

BACKGROUND

In some communication networks, multiple communication links are available for two endpoints to communicate. These communication links may enable communications on similar or different types of communication mediums such as satellite communication mediums, cellular communication mediums, cable communication mediums, etc.

Regardless of the network topology utilized by such communication networks, endpoints are usually tied together virtually. A user wanting to communicate with a server, for example, uses a physical path that is composed of network links, whose path is determined by the policies of the network owner. For example, an internet service provider (ISP) may provide network access to client devices via a hub-and-spoke network, where all traffic traverses through the hub on its way to or from remote clients. Even though there may be multiple access points for the remote client or the hub, the physical path that a packet flow takes is the same. The alternate communication paths are generally for diversity. In such implementations, all traffic is physically routed through one path, which may have many links that can change due to unforeseen circumstances. The total bandwidth is limited to the smallest communication link in the chain. As another example, consider a multi-star or mesh network. Even though there may be multiple physical communication paths to reach an endpoint from another endpoint, most of the aggregate available bandwidth (i.e., across all physical links) typically goes unused, and/or or network traffic is divided based on flows or destinations.

Link aggregation or channel bonding may refer to methods for combining multiple communication links between two communication endpoints in order to increase throughput beyond that of a single connection and/or to provide redundancy in case one of the links fails.

SUMMARY

Implementations of the disclosure are directed to network layer channel bonding methods and systems.

In one embodiment, a method, comprises: operating a first communication device to transmit data to a second communication device over a plurality of communication links, each of the communication links associated with a respective communication medium; receiving, at the first communication device, an input data stream for transmission to the second communication device, the input data stream comprising a plurality of packets; determining, at the first communication device, a throughput and latency of each of the plurality of communication links; based on the determined throughput and latency of each of the plurality of communication links: dividing the plurality of packets into multiple sets of packets, each of the sets of packets configured to be transmitted by the first communication device over a respective one of the communication links; and transmitting, from the first communication device to the second communication device, each of the sets of packets over the set's respective communication link.

In some implementations, dividing the plurality of packets into the multiple sets of packets, comprises: assigning a number of the plurality of packets to each of the sets of packets based on the throughput of the set's corresponding communication link in proportion to a sum of all of the throughputs of the physical links. In some implementations, dividing the plurality of packets into the multiple sets of packets, comprises: ordering the plurality of packets based on the determined latencies. In particular implementations, ordering the plurality of packets based on the determined latencies, comprises: ordering the plurality of packets to reduce a latency variance of the plurality of communication links.

In some implementations, the method further comprises: prior to transmitting each of the sets of packets, placing each of the sets of packets in a respective queue associated with the communication link over which the set of packets is configured to be transmitted over. In some implementations, the method further comprises: adjusting a size of each of the queues based on the determined latencies.

In some implementations, the method further comprises: prior to transmitting each of the sets of packets, adding a sequence header to each of the plurality of packets.

In some implementations, the sets of packets comprise: a first set of packets and a second set of packets, wherein the plurality of communication links comprise a first communication link and a second communication link, wherein transmitting each of the sets of packets over its respective physical communication link comprises: concurrently transmitting: the first set of packets over the first communication link, and the second set of packets over the second communication link.

In some implementations, the communication mediums comprise: a satellite communication medium and a terrestrial cable communication medium; a cellular communication medium and a terrestrial cable communication medium; two different satellite communication mediums, two different cellular communication mediums; or two different terrestrial cable communication mediums.

In one embodiment, a method comprises receiving, at each of a plurality of receivers of a destination communication device, a signal including a set of frames transmitted over a respective communication medium by a source communication device, wherein each of the sets of frames is associated with a partition of a data stream; obtaining, at the destination communication device, a plurality of packets by extracting a packet from each frame of each of the sets of frames; reading a sequence header for each of the plurality of packets; and based on the sequence headers read from the plurality of packets, reordering the plurality of packets into the data stream.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The technology disclosed herein, in accordance with one or more embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

Some present communication systems utilize one of two types of channel bonding techniques: layer 2 (L2) channel bonding and layer 3 (L3) link aggregation. L2 channel bonding usually requires the same communication medium (e.g., two LEO satellite communication mediums) for all the channels. For example, in DVB-S2x channel bonding, a stream may be transported over three satellite transponders that are treated as one logical transponder.

L3 link aggregation typically requires that the communication mediums are similar in terms of their properties and the traffic flows (e.g., Transmission Control Protocol (TCP) sessions) are not split between them. Consider the case of a communication system that implements L3 link aggregation between two endpoints, where there are two different physical link paths between the endpoints. During communication between the endpoints, each traffic flow sent between the endpoints is put onto only one of the link paths. For example, if there are seven traffic flows between the two endpoints (e.g., flow 1, flow 2, . . . flow 7), traffic flows 1, 3, and 7 may be placed on the first physical link path, and traffic flows 2, 4, 5, and 6 may be placed on the second physical link path. In instances where both physical link paths operate at about the same throughput (e.g., 50 Megabits per second (Mbps) for each of the two sets of traffic flows), the total throughput between the two endpoints could potentially be doubled (e.g., to 100 Mbps). On the other hand, if almost no new traffic is received on one of the communication paths (e.g., traffic flows 1, 3, and 7), and significant traffic is received on the other communication path (e.g., traffic flows 2, 4, 5, and 6), the total throughput between the two endpoints may be limited to the maximum throughput of a single path (e.g., 50 Mbps) unless the communication path that is not receiving new traffic has traffic waiting (e.g., in a buffer), which itself causes latency and jitter. As the foregoing example illustrates, L3 link aggregation may cause traffic to build up on one or more of the link paths while underutilizing one or more of the other link paths.

Various implementations of the disclosure are directed to network layer channel bonding techniques that address some of the limitations of conventional channel bonding techniques. In accordance with implementations of the disclosure, data of one or more traffic flows from two or more links of a network system may be combined to allow an overall throughput that is equal to or comparable to the sum of those links. As further discussed below, packets of data flows may be combined at layer 3 of the Open Systems Interconnection model (OSI) model. By virtue of utilizing the channel bonding methods and systems described herein, data may be transmitted on different types of communication mediums (e.g., satellite and cellular, two different satellite communication mediums, etc.). Additionally, the channel bonding techniques described herein may permit data to be transmitted on different physical links having different speeds and/or latencies while taking advantage of the full bandwidth available on each of the physical links between two endpoints of the communication system. These and other advantages that may be realized by the present disclosure are discussed below.

Figure 1:
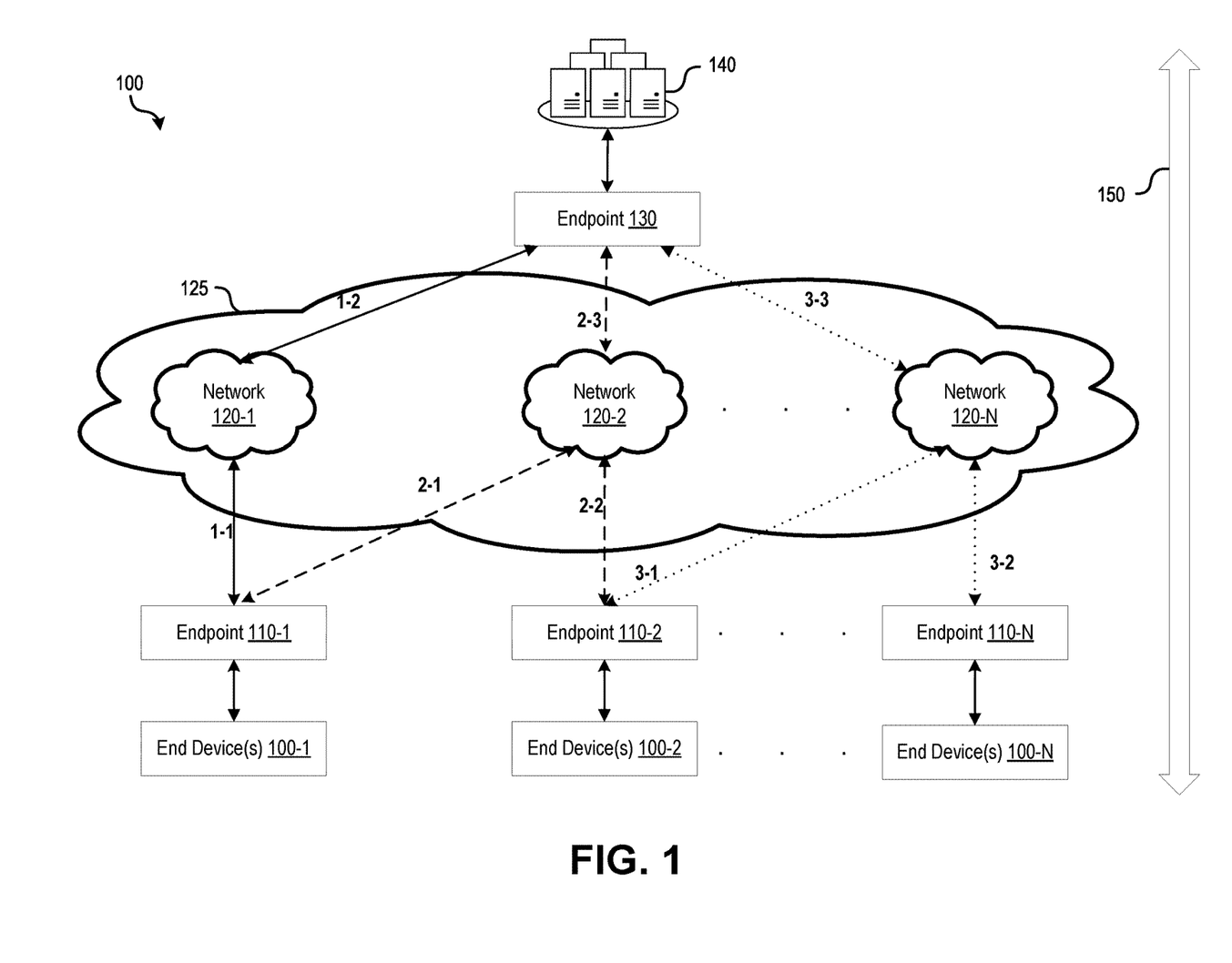
FIG. 1 illustrates an example communication system in which the channel bonding systems and methods described herein may be implemented.

FIG. 1 illustrates an example communication system 100 in which the channel bonding systems and methods described herein may be implemented. In this example, communication system 100 is implemented as a hub-and-spoke network whereby all network traffic traverses through endpoint 130 to/from endpoints 110-1 through 110-N (individually referred to as "an endpoint 110" and collectively referred to as "endpoints 110"). Communication system 100 may correspond to a system whereby an ISP associated with endpoint 130 provides subscribers associated with endpoints 110 and end devices 100-1 through 100-N (individually referred to as an "end device 100" and collectively referred to as "end devices 100") network access (e.g., Internet access) to servers 140 (e.g., web servers). It should be noted, however, that the channel bonding techniques described herein are not limited to hub-and-spoke network systems or network systems where an ISP provides network access to subscribers. For example, the techniques described herein may be implemented in any type of mesh network such as multistar network configurations between endpoints, in ad-hoc networks between endpoints, etc.

End devices 100 may be any client device configured to generate a traffic flow that is transmitted to server system 140 by an endpoint 110 over multinetwork 125, further described below. For example, an end device 100 may be a smartphone, a laptop, a desktop computer, a tablet, a smart television, a smart speaker, a smart home device, etc. A given traffic flow may carry image, video, audio, and/or other information Endpoint 110 and endpoints 130 are communication devices configured to implement the channel bonding techniques described herein. In particular, as depicted by FIG. 1, a given endpoint 110 may transmit data to endpoint 130 or receive data from endpoint 130 over a plurality of networks 120-1 through 120-N (individually referred to as a "network 120"). These communication networks may be collectively referred to as a "multinetwork" 125. Each network 120 of multinetwork 125 may be associated with a respective communication medium. For example, a given network 120 may correspond to a satellite communication medium (e.g., geosynchronous (GEO) satellite, low earth orbit (LEO) satellite, etc.), a cellular communication medium (e.g., 3G, 4G, Long Term Evolution (LTE), 5G, etc.), a cable communication medium, etc. An endpoint 110 or 130 may access each network 120 via a given physical link. For example, endpoint 130 is depicted as accessing networks 120-1, and 120-2, and 120-N via physical links 1-2, 2-3, and 3-3, respectively. Endpoint 110-1 is depicted as accessing networks 120-1 and 120-2 via physical links 1-1 and 2-1, respectively. Endpoint 110-2 is depicted as accessing networks 120-2 and 120-N via physical links 2-2 and 3-1, respectively. Endpoint 110-N is depicted as accessing network 120-N via physical link 3-2. In some implementations, an endpoint 110 or 130 may be implemented as a modem (e.g., satellite modem) or a gateway (i.e., combined modem router such as a satellite gateway). In some implementation, an endpoint 110 may be integrated into an end device 100 that generates data for transmission over multinetwork 125.

By implementing the network layer channel bonding techniques describe herein, a source endpoint may transmit traffic to a destination endpoint via all networks that both endpoints are communicatively coupled to. As such, by bonding communication channels together, each endpoint may have more bandwidth than any one link. By way of particular example, consider the case where endpoint 110-1 is able to transmit data over two different outroutes of two different satellite links (e.g., satellite link 1-1 and satellite link 2-1), each satellite link having a maximum throughput of 100 Mbps. In such a case, endpoint 110 may transmit up to 200 Mbps of traffic to endpoint 130, regardless of whether a given data flow is transmitted through network 120-1, network 120-2, or some combination thereof. As another example, consider the case where endpoint 110-2 is able to transmit data to endpoint 130 over a satellite link (e.g., link 2-2 or 3-1) having a maximum throughput of 100 Mbps and a cellular link (e.g., link 2-2 or 3-1) having a maximum throughput of 30 Mbps. In this scenario, despite the different speeds and communication mediums used by each the of the links, an aggregate throughput of up to 130 Mbps may be achieved. As such, the foregoing system enables the use of different links at different speeds, and on different communication mediums.

Each endpoint may include the necessary hardware, software, and/or firmware to provide functions such as traffic flow routing, packet processing, performance-enhancing proxies (PEPs), network acceleration (e.g., IP spoofing, web acceleration, and other network accelerations functions), etc. Due to the presence of PEPs and network accelerators, a source endpoint may have knowledge of each destination endpoint. An endpoint may also have knowledge of the physical links or connections (e.g., 1-1, 1-2, 2-1, 2-2, 2-3, 3-1, 3-2, or 3-3) that lead to a destination endpoint, as well as the characteristics and limitations of the various physical links leading to that endpoint. The physical link may have a committed information rate (CIR) allocated to use for the entire link, as well as a CIR for each of the endpoints that use that link. A given endpoint may also have the software needed to encode packets such that a modem of the endpoint may transmit the data to the remote endpoint.

Due to throughput and/or latency differences over different communication links, an algorithm may be used to parse and order the data to the physical links, in a manner that alleviates waiting for packets on slower communications links. The amount of data that is transmitted on each physical link may be proportional to the throughput on the physical link. In some implementations, a small packet header may be used to allow packets to be reordered when arriving at a destination endpoint. In some implementations, a destination endpoint may send feedback to a source endpoint to allow for adjusting bandwidth on a given link due to congestion and/or physical faults. Each endpoint may also send feedback about the latency and jitter on a given link. The traffic flows on each physical link may be configured to meet both bandwidth and QoS requirements. Moreover, excess bandwidth may be traded for providing resiliency by duplicating traffic along various links. Latency sensitive traffic may be placed on a link with less jitter/latency issues whereas traffic that is not latency sensitive could be placed on another link. For example, HTTP Gets may be placed on a lower latency link, whereas TCP acknowledgements may be placed on a higher latency link.

In various implementations, endpoints may be grouped by virtual links. For multinetwork 125, a virtual link defining a virtual path 150 from a source endpoint to a destination endpoint may be created, and its parameters may be stored at the source endpoint and/or destination endpoint. A virtual link may be composed of different physical links with different characteristics such as latency and speed. For example, a given endpoint may have a CIR for each physical link, which may be combined to create a CIR for a given virtual link between two endpoints. The CIR for a given physical link may refer to the maximum throughput that the link can carry and/or is assigned to the endpoints.

Figure 2:
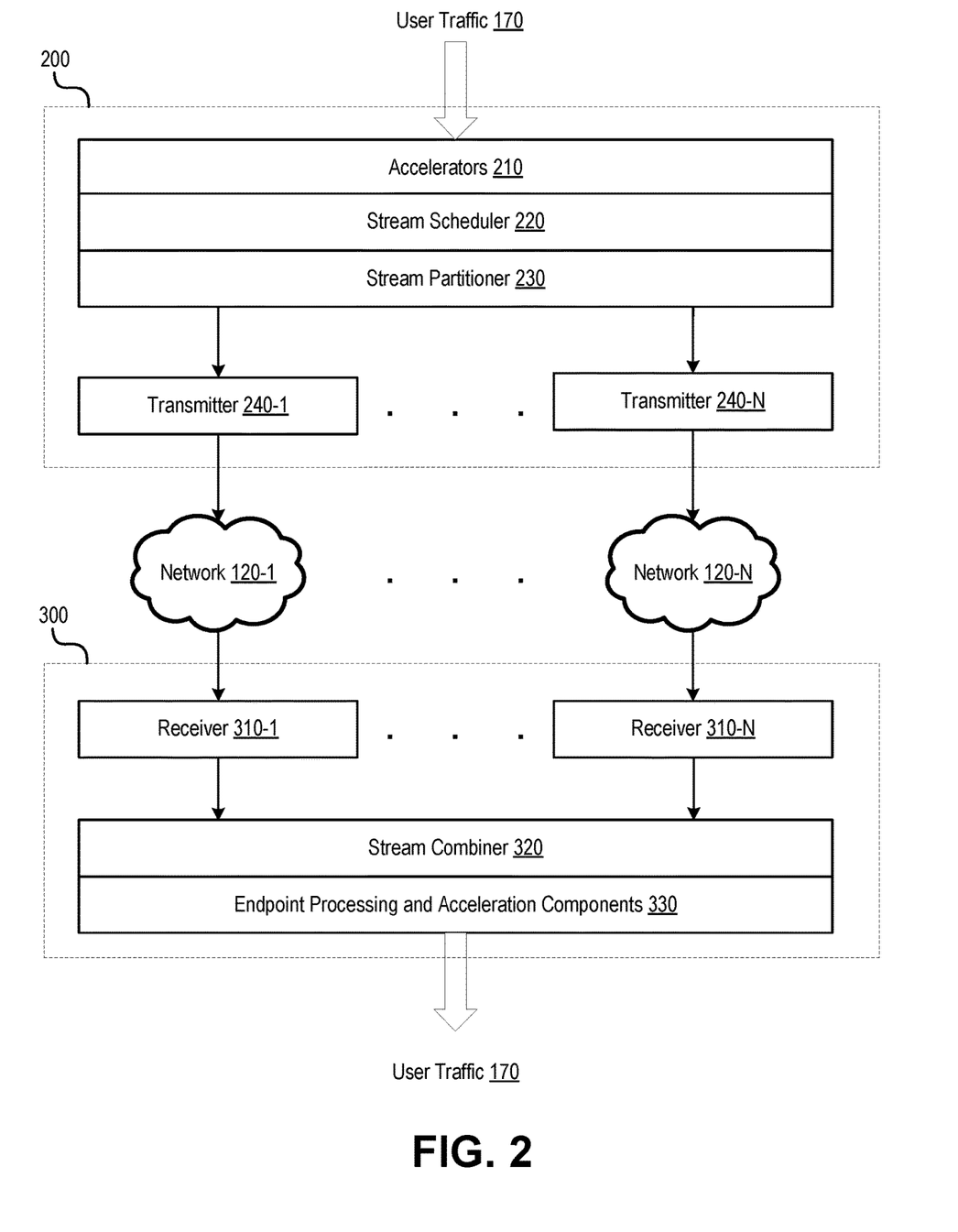
FIG. 2 is a block diagram illustrating an example data flow of user traffic from a source endpoint to a destination endpoint, where channel bonding is implemented in accordance with implementations of the disclosure.

FIG. 2 is a block diagram illustrating an example data flow of user traffic 170 from a source endpoint 200 to a destination endpoint 300, where channel bonding is implemented in accordance with implementations of the disclosure. For simplicity of illustration, some components of source endpoint 200 and destination endpoint 300 are not shown.

The user traffic 170 may originate, for example, as a data stream generated by an end device 100 communicatively coupled to the source endpoint 200. Packets of user traffic 170 are received by a receiver (not shown) of source endpoint 200 and appropriately routed. The received packets may be accelerated using one or more accelerators 210. The one or more accelerators 210 may accelerate the packets based on the characteristics of the physical link (e.g., satellite, cellular, etc.) they are destined for. For example, PEPS and network acceleration may be applied to the received packets. In other implementations, packet acceleration may not be applied.

After packet acceleration, stream scheduler 220 may configured to place a stream's packets in one or more queues that are ready to be transmitted. These queues may be based on quality of service (QoS). In this instance, because source endpoint 200 is configured to transmit packets over different communication mediums, the packets may be placed in the queues based on a virtual link (as opposed to a single physical link) defining a virtual path of multiple physical links from source endpoint 200 to destination endpoint 300. In particular, the stream scheduler 220 may schedule traffic on the virtual link based on the CIR for the endpoint, and the CIR of the destination endpoint 300.

Thereafter, stream partitioner 230 is configured to take the stream of data and divide and order the data flow according to the different throughputs and different latencies of the various physical links on the virtual link from source endpoint 200 to destination endpoint 300. To this end, stream partitioner 230 may implement an algorithm that monitors the physical links for each of their properties (e.g., throughput and latency). The number of input frames sent on each link may be proportional to a maximum throughput allowed (e.g., CIR) for each physical link.

Figure 3:
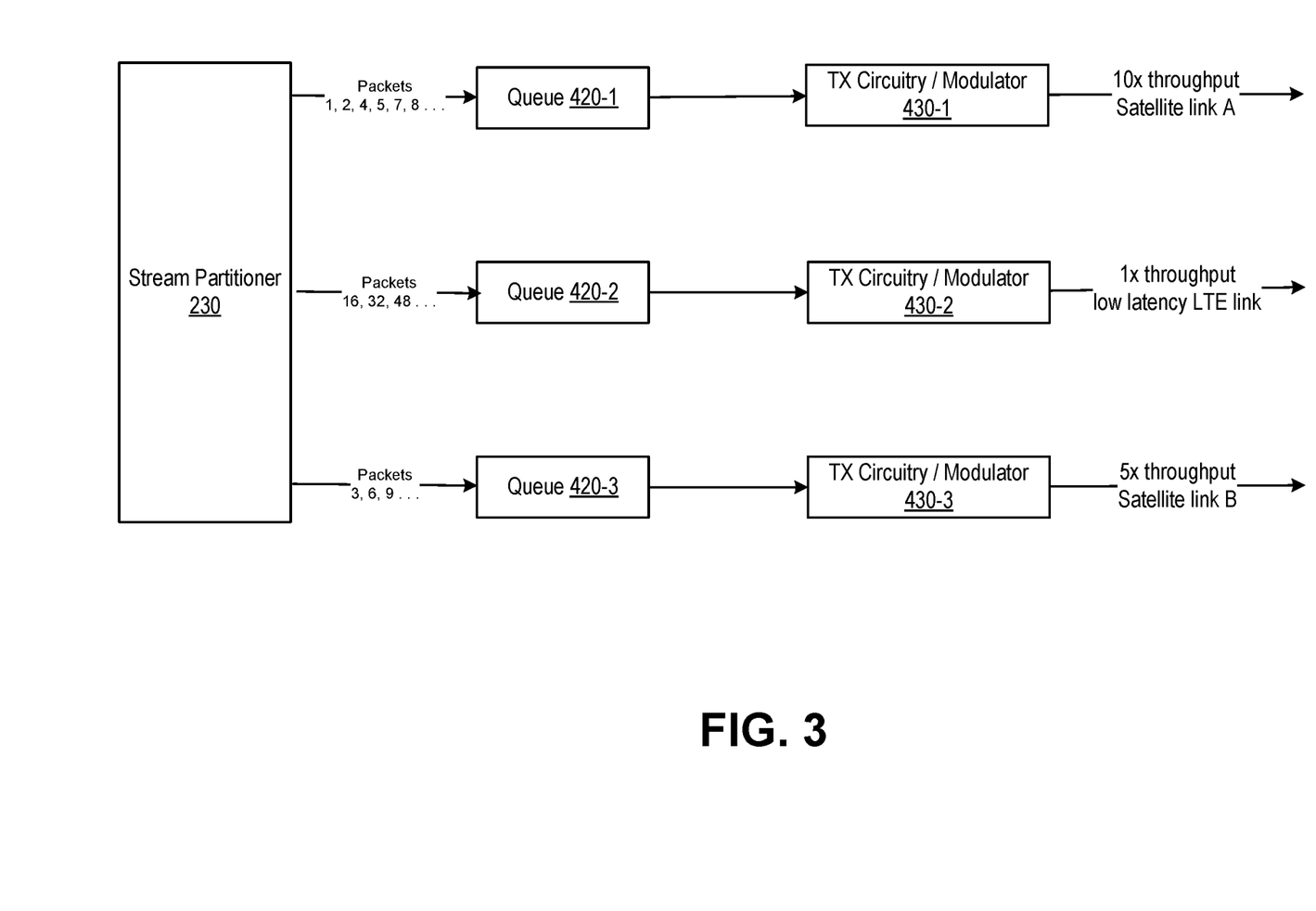
FIG. 3 illustrates one particular example of a stream partitioner dividing and ordering packets of a data stream in an implementation where a source endpoint transmits data streams to a destination endpoint over three physical links.

FIG. 3 illustrates one particular example of a stream partitioner 230 dividing and ordering packets of a data stream in an implementation where source endpoint 200 transmits data streams to a destination endpoint 300 over three physical links: satellite link A, satellite link B, and a low latency LTE link. As depicted in this example, the LTE link has a throughput of 1×, satellite link B has a throughput of 5×, and satellite link A has a throughput of 10×. Based on the relative throughputs, for every packet assigned to the LTE link for transmission using transmit (TX) circuitry/modulator 403-1, five packets are assigned to satellite link B for transmission using transmit (TX) circuitry/modulator 403-2, and ten packets are assigned to satellite link C for transmission using transmit (TX) circuitry/modulator 403-3. Additionally, the packets are ordered/scheduled based on the relative latencies of the different communication links. For example, the packets may be ordered to account for the approximate 250 ms latency delay associated with satellite transmissions, and the low latency delay (e.g., 15-20 ms) associated with the LTE link. As such, the packets may be reordered to reduce the jitter and the latency difference between the links. This may also help reduce the size of buffers on a stream combiner 320 of destination endpoint 300, further discussed below. The stream partitioner 230 may place the packets in respective queues 420-1, 420-2, or 420-3, and each queue may be implemented as a jitter buffer, whereby the size of each queue is continually adjusted to keep the overall end to end jitter low.

Referring again to FIG. 2, after stream partitioner 230 divides and orders the data flow according to the different throughputs and different latencies of the various physical links, the partitioned data flow may be transmitted to destination endpoint 300 over a plurality of networks 120-1 to 120-N using a respective plurality of transmitters 240-1 to 240-N (individually referred to as a "transmitter 240" and collectively referred to as "transmitters 240"). In various implementations, the packets of the partitioned data flow may be transmitted in parallel over multiple networks of multinetwork 125 to maximize an aggregate transmission throughput. Although transmitters 240 are depicted in this example as being components of source endpoint 200, in other implementations, source endpoint 200 may route the packets to transmitters 240 of one or more secondary devices for transmission.

In some implementations, a small header may be placed on each packet as it is sent in order for a stream combiner of destination endpoint 300 to reorder the packets. This header may contain a sequence number that is based on both the QoS and the destination endpoint 300. When the stream partitioner 230 attempts to use multiple links for a given traffic flow (e.g., QoS plus destination endpoint), it may use the header to identify this flow. For example, if an endpoint has 12 QoSs, the destination endpoint may be considered twelve different endpoints. In such a scenario, the stream combiner 320 may reorder packets for twelve different streams or flows, each stream or flow comprising traffic going to a unique destination (i.e., QoS plus destination endpoint).

Referring now to destination endpoint 300, the different partitions of the partitioned data stream transmitted over multinetwork 125 may be received by a plurality of receivers 310-1 to 310-N (individually referred to as a "receiver 310" and collectively referred to as "receivers 310") of destination endpoint 300. In particular, each receiver 310 may receive, from a respective network 120, a signal including a set of frames encapsulating packets corresponding to a partition of the partitioned data stream. The packets may be extracted from the frames and subsequently combined using stream combiner 320.

In particular, stream combiner 320 is configured to read a header (e.g., containing sequence number) from each of the packets to reorder the packets into a receive data stream. An appropriate receiver algorithm may be implemented to ensure that dropped packets are caught, and to ensure in-order delivery of packets. If a gap is identified, but not recognized as dropped, the packets may be placed in a re-order queue. Once the gap is cleared or recognized as a drop, the re-ordered queue may emptied to the awaiting next level of software. Optionally, destination endpoint 300 may establish a feedback loop with source endpoint 200. This may provide feedback on traffic flow so that the source endpoint 200 may modify the physical links and how much traffic it can use for the source endpoint.

As also depicted in FIG. 2, destination endpoint 300 may also include processing and/or acceleration components 330 to provide additional processing and/or acceleration functions to the extracted, reordered, and combined packets of the data flow.

Figure 4:
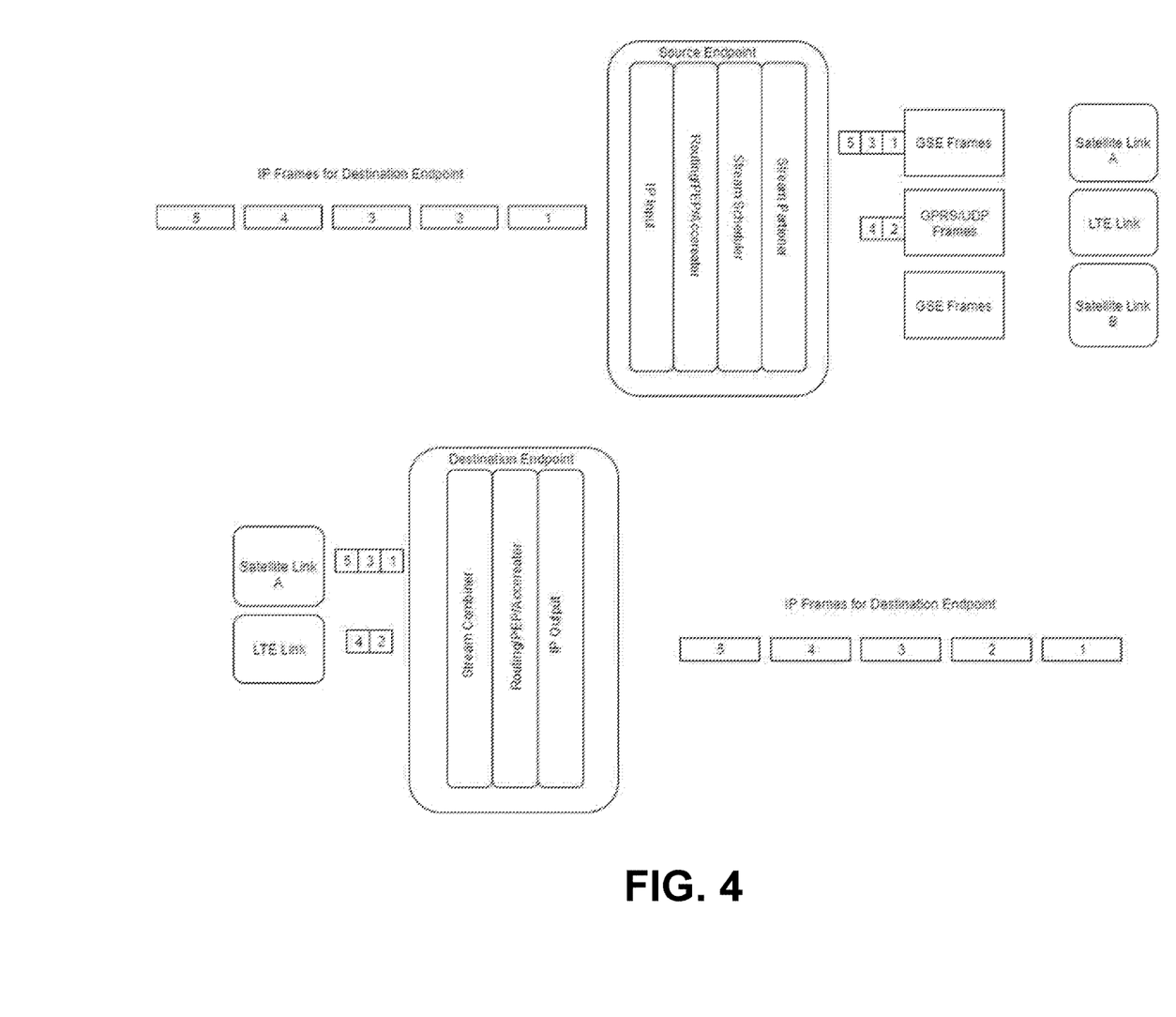
FIG. 4 provides a simplified representation of the operation of a source endpoint and a destination endpoint in a particular implementation where IP frames are transmitted over two of three available communication links.

FIG. 4 provides a simplified representation of the operation of a source endpoint 200 and a destination endpoint 300 in a particular implementation where IP frames are transmitted over two of three available communication links (a first satellite link, an LTE link, and a second satellite link). As depicted, five frames corresponding to five packets are reordered and transmitted as GSE frames over the first satellite communication link and as GPRS/UDP frames over the LTE link. Each set of frames is received by the destination endpoint over each respective link, and reordered and combined using a stream combiner of the destination endpoint.

Figure 5:
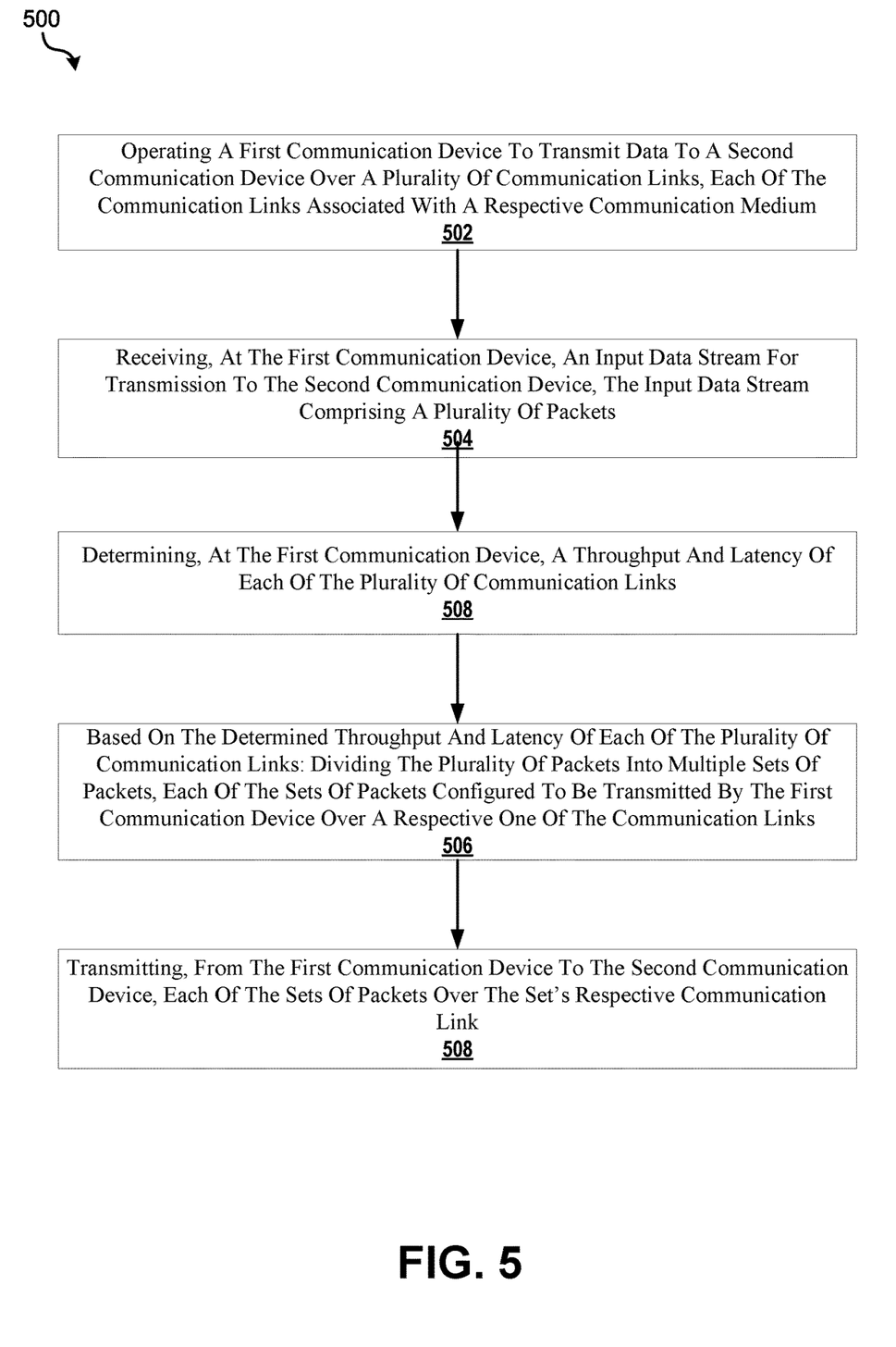
FIG. 5 is an operational flow diagram illustrating an example method that may be performed by a first communication device to implement network layer channel bonding when transmitting to a second communication device, in accordance with implementations of the disclosure.

FIG. 5 is an operational flow diagram illustrating an example method 500 that may be performed by a first communication device to implement network layer channel bonding when transmitting to a second communication device, in accordance with implementations of the disclosure. For example, the first communication device may correspond to source endpoint 200 and the second communication device may correspond to destination endpoint 300. In some implementations, the operations of method 500 may be implemented by the first communication device in response to a processor of the first communication device executing instructions stored on a non-transitory computer readable medium of the first communication device.

At operation 502, the first communication device is operated to transmit data to a second communication device over a plurality of communication links, each of the communication links associated with a respective communication medium. For example, the communication mediums may comprise one or more satellite communication mediums and one or more cellular communication mediums, two or more different satellite communication mediums, or two or more different cellular communication mediums.

In some implementations, operating the first communication device to transmit the data may include preparing the first communication device for data transmissions to the second communication device. For example, the first communication device may establish a virtual link from the first communication to the second communication device based on a plurality of physical links that include the plurality of communication links. For example, when configuring the virtual link, the first communication device may establish a CIR and other parameters associated with each of the physical links. Additionally, the first communication device may perform a handshake procedure (e.g., TCP 3-way handshake) with the second communication device to initiate data communications.

At operation 504, the first communication device receives an input data stream for transmission to the second communication device, the input data stream comprising a plurality of packets. For example, the input data stream may be received from an end device 100 as described above. After receiving the input data stream, a stream scheduler of the first communication device (e.g., stream scheduler 220) may place the stream's packets in one or more queues (e.g., based on QoS conditions) that are ready to be transmitted.

At operation 506, the first communication device determines a throughput and latency of each of the plurality of communication links.

At operation 508, based on the determined throughput and latency of each of the plurality of communication links: the first communication device divides the plurality of packets into multiple sets of packets, each of the sets of packets configured to be transmitted by the first communication device over a respective one of the communication links. To this end, a stream partitioner 230 as described above may be utilized.

In some implementations, dividing the plurality of packets into the multiple sets of packets, comprises: assigning a number of the plurality of packets to each of the sets of packets based on the throughput of the set's corresponding communication link in proportion to a sum of all of the throughputs of the physical links. In such implementations, dividing the plurality of packets into the multiple sets of packets, may further comprise: ordering the plurality of packets based on the determined latencies. In particular, the packets may be ordered to reduce a latency variance of the plurality of communication links.

At operation 510, the first communication device transmits, to the second communication device, each of the sets of packets over the set's respective communication link. In various implementations, each of the sets of packets may be concurrently transmitted over each of the sets of communication links. For example, by transmitting the different sets of packets in parallel, the throughput from the first communication device to the second communication device may be greater than the throughput of any individual communication link. In some implementations, prior to transmission of each of the sets of packets, each of the sets of packets is placed in a respective queue associated with the communication link over which the set of packets is configured to be transmitted over. The size of each of the queues may be periodically or continuously adjusted based on the determined latencies.

In some implementations, prior to transmission of each of the sets of packets, a sequence header is added to each of the plurality of packets. The header may contain a sequence number that is based on both the QoS and the destination endpoint 300.

Figure 6:
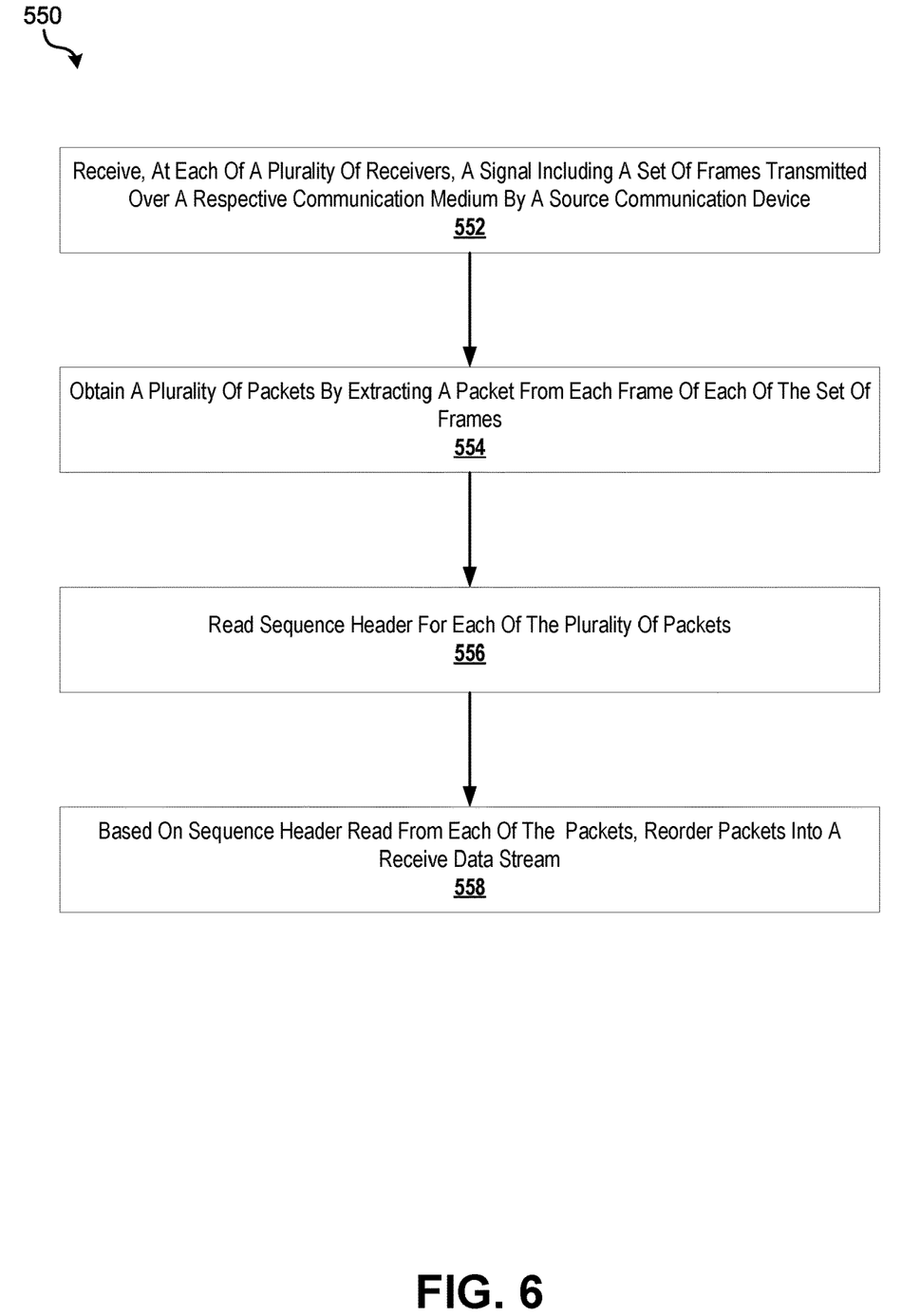
FIG. 6 is an operational flow diagram illustrating an example method that may be implemented by a destination communication device to provide network layer channel bonding when receiving data from a source communication device, in accordance with implementations of the disclosure.

FIG. 6 is an operational flow diagram illustrating an example method 550 that may be implemented by a destination communication device (e.g., destination endpoint 300) to provide network layer channel bonding when receiving data from a source communication device (e.g., source endpoint 200), in accordance with implementations of the disclosure. In some implementations, the operations of method 550 may be implemented by the destination communication device in response to a processor of the destination communication device executing instructions stored on a non-transitory computer readable medium of the destination communication device.

At operation 552, the destination communication device receives, at each of a plurality of receivers, a signal including a set of frames transmitted over a respective communication medium by a source communication device. At operation 554, a plurality of packets are obtained by extracting a packet from each frame of each of the sets of frames. At operation 556, a sequence header (e.g., sequence number) is read for each of the plurality of extracted packets. At operation 558, based on the sequence headers read from the packets, the packets are reordered into a receive data stream.

Where QoS is implemented at the destination endpoint, sequence headers may be based on the QoS in addition to the destination communicative device. As such, a stream combiner of the destination communication device may reorder packets for each stream or traffic flow having its own QoS.

In some implementations, the destination communication device may be further configured to send feedback to the source communication device regarding bandwidth on a given physical link traversed by one or more of the signals. For example, the feedback may indicate traffic congestion and/or physical faults on a given physical link. In some implementations, the destination communication device may be further configured to send feedback to the source communication device regarding latency and/or jitter on a given physical link traversed by one or more of the signals. Using this feedback, data stream partitions may be adjusted by the stream partitioner of the source communication device.

Figure 7:
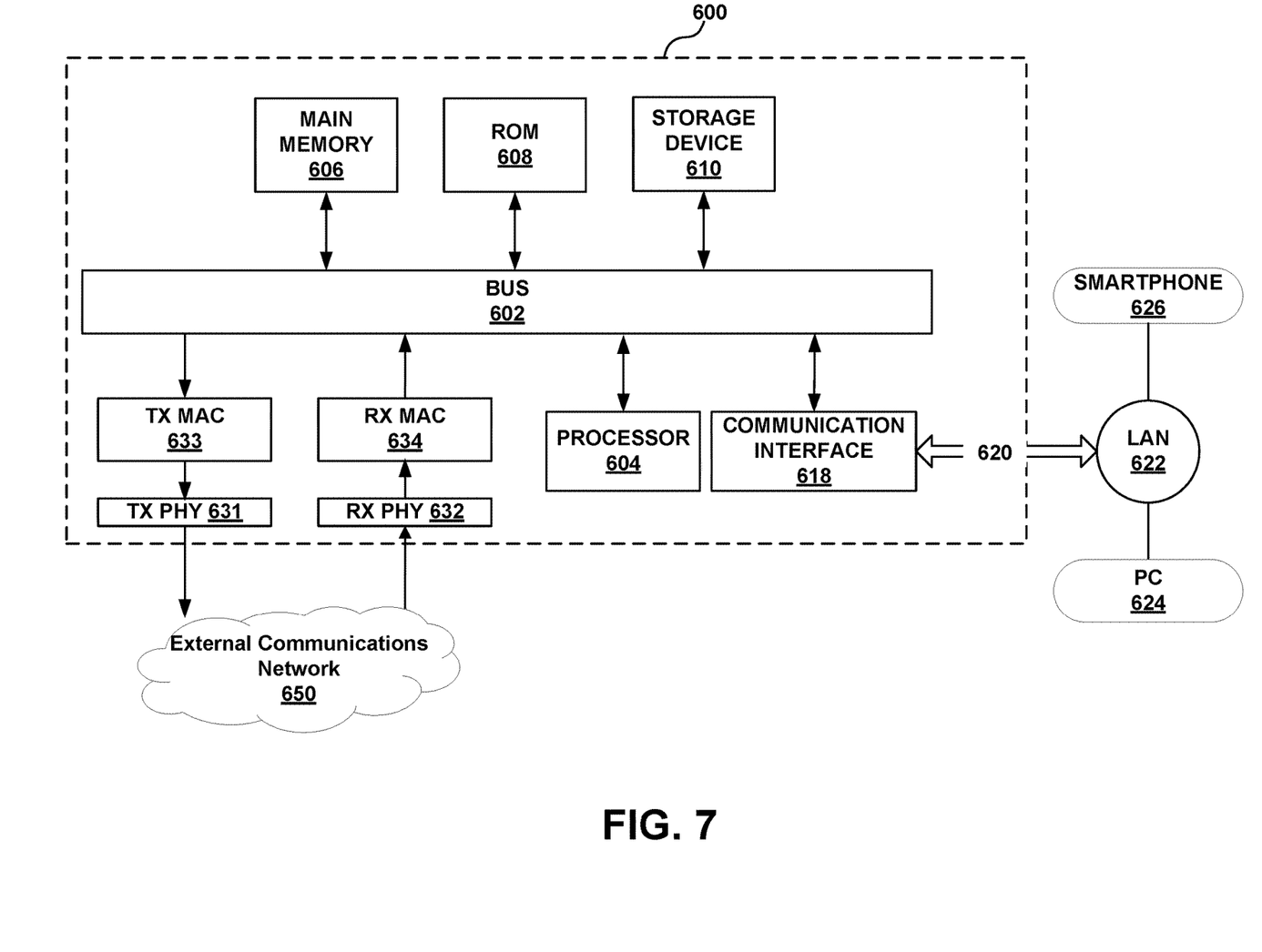
FIG. 7 illustrates a computer system/communication device upon which example embodiments according to the present disclosure can be implemented.

FIG. 7 illustrates a computer system/communication device 600 upon which example embodiments according to the present disclosure can be implemented. Computer system 600 can include a bus 602 or other communication mechanism for communicating information, and a processor 604 coupled to bus 602 for processing information. Computer system 600 may also include main memory 606, such as a random access memory (RAM) or other dynamic storage device, coupled to bus 602 for storing information and instructions to be executed by processor 604. Main memory 606 can also be used for storing temporary variables or other intermediate information during execution of instructions to be executed by processor 604. Computer system 600 may further include a read only memory (ROM) 608 or other static storage device coupled to bus 602 for storing static information and instructions for processor 604. A storage device 610, such as a magnetic disk or optical disk, may additionally be coupled to bus 602 for storing information and instructions.

According to one embodiment of the disclosure, network layer channel bonding may be provided by computer system 600 in response to processor 604 executing an arrangement of instructions contained in main memory 606. Such instructions can be read into main memory 606 from another computer-readable medium, such as storage device 610. Execution of the arrangement of instructions contained in main memory 606 causes processor 604 to perform one or more processes described herein. One or more processors in a multiprocessing arrangement may also be employed to execute the instructions contained in main memory 606. In alternative embodiments, hard-wired circuitry is used in place of or in combination with software instructions to implement various embodiments. Thus, embodiments described in the present disclosure are not limited to any specific combination of hardware circuitry and software.

Computer system 600 may also include a communication interface 618 coupled to bus 602. Communication interface 618 can provide a two-way data communication coupling to a network link 620 connected to a local network 622. Wired and/or wireless links may be implemented. In any such implementation, communication interface 618 sends and receives electrical, electromagnetic, or optical signals that carry digital data streams representing various types of information.

Network link 620 may provide data communication through one or more networks to other data devices. By way of example, network link 620 can provide a connection through local area network 622 to network devices, for example including a host computer (PC) 624, a smartphone 626, and the like. Local area network 622 may both use electrical, electromagnetic, or optical signals to convey information and instructions. The signals through the various networks and the signals on network link 620 and through communication interface 618, which communicate digital data with computer system 600, are example forms of carrier waves bearing the information and instructions.

Computer system 600 may send messages and receive data, including program code, through the network(s), network link 620, and communication interface 618. In the Internet example, a server (not shown) might transmit requested code belonging to an application program for implementing an embodiment of the present disclosure through local network 622 and communication interface 618. Processor 604 executes the transmitted code while being received and/or store the code in storage device 610, or other non-volatile storage for later execution. In this manner, computer system 600 obtains application code in the form of a carrier wave.

Computer system 600 includes equipment for communication with an external communications network. In particular, the computer system 600 may include a transmit-side physical-layer device (TX PHY) 631, a receive-side physical-layer device (RX PHY) 632, a transmit-side media access controller (TX MAC) 633, and a receive-side media access controller (RX MAC) 634. Transmit packets may be provided to the TX MAC 633 and TX PHY 631, which provide corresponding signals to the external communications network 650. For example, in a satellite communications network, TX MAC may be a TX satellite link controller (SLC), and TX PHY 631 may provide corresponding signals to a satellite using a terrestrial antenna/dish. Signals received from an external communications network 650 may be received via RX PHY 632 and RX MAC 634, from which receive packets may be obtained.

Figure 8:
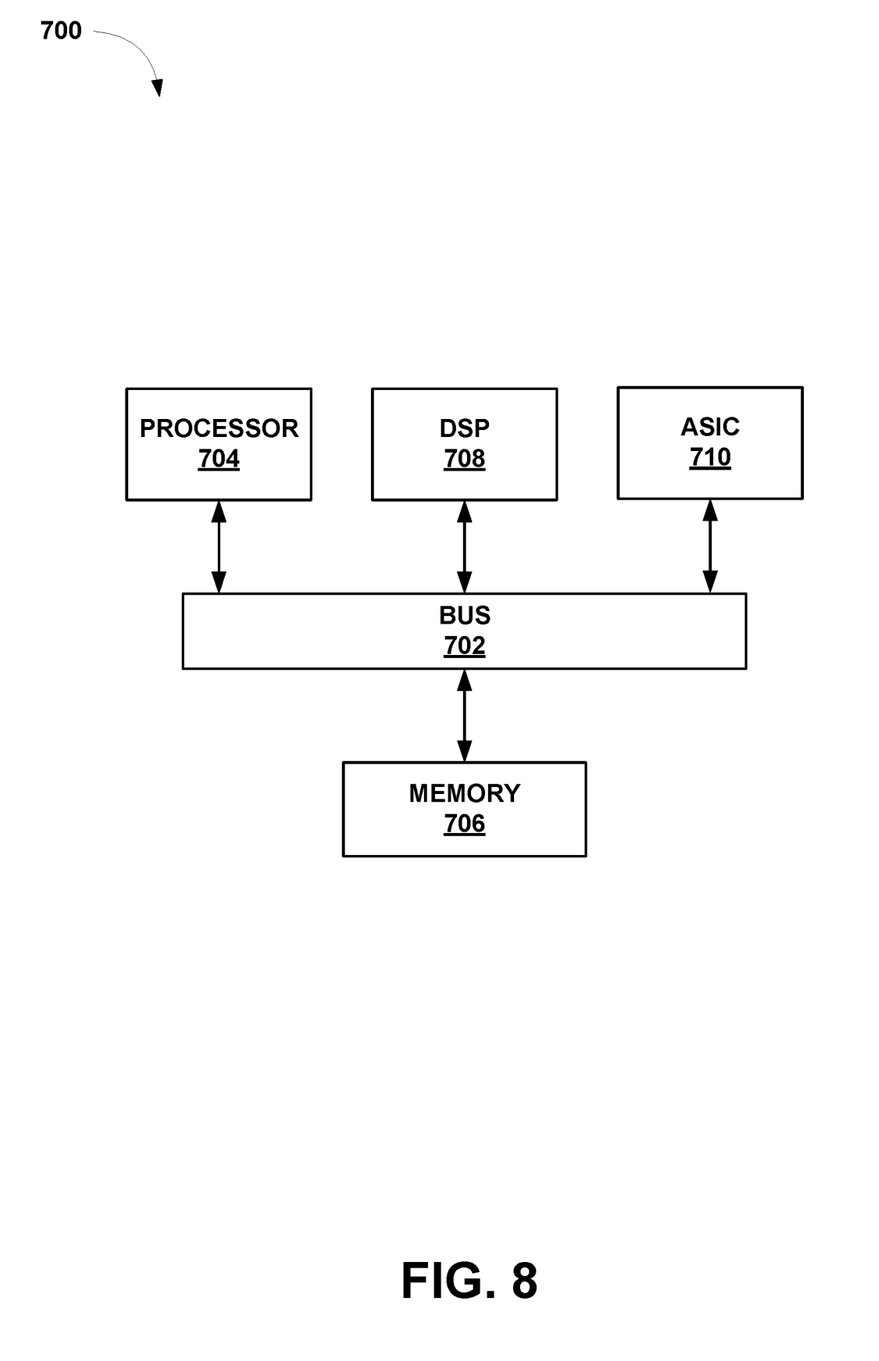
FIG. 8 illustrates a chip set in which embodiments of the disclosure may be implemented.

FIG. 8 illustrates a chip set 700 in which embodiments of the disclosure may be implemented. Chip set 700 can include, for instance, processor and memory components described with respect to FIG. 8 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, chip set 700 includes a communication mechanism such as a bus 1002 for passing information among the components of the chip set 700. A processor 704 has connectivity to bus 702 to execute instructions and process information stored in a memory 706. Processor 704 includes one or more processing cores with each core configured to perform independently. A multi-core processor enables multiprocessing within a single physical package. Examples of a multi-core processor include two, four, eight, or greater numbers of processing cores. Alternatively or in addition, processor 704 includes one or more microprocessors configured in tandem via bus 702 to enable independent execution of instructions, pipelining, and multithreading. Processor 1004 may also be accompanied with one or more specialized components to perform certain processing functions and tasks such as one or more digital signal processors (DSP) 708, and/or one or more application-specific integrated circuits (ASIC) 710. DSP 708 can typically be configured to process real-world signals (e.g., sound) in real time independently of processor 704. Similarly, ASIC 710 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

Processor 704 and accompanying components have connectivity to the memory 706 via bus 702. Memory 706 includes both dynamic memory (e.g., RAM) and static memory (e.g., ROM) for storing executable instructions that, when executed by processor 704, DSP 708, and/or ASIC 710, perform the process of example embodiments as described herein. Memory 706 also stores the data associated with or generated by the execution of the process.

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

The various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Each of the processes, methods, and algorithms described in the preceding sections may be embodied in, and fully or partially automated by, code components executed by one or more computer systems or computer processors comprising computer hardware. The processes and algorithms may be implemented partially or wholly in application-specific circuitry. The various features and processes described above may be used independently of one another, or may be combined in various ways. Different combinations and subcombinations are intended to fall within the scope of this disclosure, and certain method or process blocks may be omitted in some implementations. Additionally, unless the context dictates otherwise, the methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
    operating a first communication device to transmit data to a second communication device over a plurality of communication links, each of the communication links associated with a respective communication medium;
    receiving, at the first communication device, an input data stream for transmission to the second communication device, the input data stream comprising a plurality of packets;
    determining, at the first communication device, a throughput and latency of each of the plurality of communication links;
    based on the determined throughput and latency of each of the plurality of communication links: dividing the plurality of packets into multiple sets of packets by ordering, based on the determined latencies, the plurality of packets to reduce a latency variance of the plurality of communication links, each of the sets of packets configured to be transmitted by the first communication device over a respective one of the communication links;
    placing each of the sets of packets in a respective queue associated with the communication link over which the set of packets is configured to be transmitted over; and
    after placing each of the sets of packets in the respective queue, concurrently transmitting, from the first communication device to the second communication device, the sets of packets over the communication links, each of the sets of packets transmitted over its respective communication link.

2. The method of claim 1, wherein dividing the plurality of packets into the multiple sets of packets, further comprises: assigning a number of the plurality of packets to each of the sets of packets based on the throughput of the set's corresponding communication link in proportion to a sum of all of the throughputs of the communication links.

3. The method of claim 1, further comprising: adjusting a size of each of the queues based on the determined latencies.

4. The method of claim 1, further comprising: prior to concurrently transmitting the sets of packets, adding a sequence header to each of the plurality of packets.

5. The method of claim 1, wherein the communication mediums comprise: a satellite communication medium and a cellular communication medium; a satellite communication medium and a terrestrial cable communication medium; or a cellular communication medium and a terrestrial cable communication medium.

6. The method of claim 1, wherein the communication mediums comprise: two different satellite communication mediums, two different cellular communication mediums, or two different terrestrial cable communication mediums.

7. The method of claim 1, further comprising: before dividing the plurality of packets into the multiple sets of packets, placing, based on a total committed information rate (CIR) of a virtual link defining a virtual path of the plurality of communication links from the first communication device to the second communication device, the plurality of packets of the input data stream in one or more queues based on quality of service (QoS) conditions.

8. The method of claim 7, further comprising: prior to concurrently transmitting the sets of packets, adding a sequence header to each of the plurality of packets, the sequence header comprising a sequence number identifying a QoS and the second communication device.

9. A system, comprising:
    a processor; and
    a non-transitory computer-readable storage medium storing instructions that, when executed by the processor, cause the system to perform operations comprising:
    operating a first communication device to transmit data to a second communication device over a plurality of communication links, each of the communication links associated with a respective communication medium;
    receiving, at the first communication device, an input data stream for transmission to the second communication device, the input data stream comprising a plurality of packets;
    determining, at the first communication device, a throughput and latency of each of the plurality of communication links;
    based on the determined throughput and latency of each of the plurality of communication links: dividing the plurality of packets into multiple sets of packets by ordering, based on the determined latencies, the plurality of packets to reduce a latency variance of the plurality of communication links, each of the sets of packets configured to be transmitted by the first communication device over a respective one of the communication links;
    placing each of the sets of packets in a respective queue associated with the communication link over which the set of packets is configured to be transmitted over; and after placing each of the sets of packets in the respective queue, concurrently transmitting, from the first communication device to the second communication device, the sets of packets over the communication links, each of the sets of packets transmitted over its respective communication link.

10. The system of claim 9, wherein dividing the plurality of packets into the multiple sets of packets, further comprises: assigning a number of the plurality of packets to each of the sets of packets based on the throughput of the set's corresponding communication link in proportion to a sum of all of the throughputs of the communication links.

11. The system of claim 9, wherein the operations further comprise: adjusting a size of each of the queues based on the determined latencies.

12. The system of claim 9, wherein the operations further comprise: prior to concurrently transmitting the sets of packets, adding a sequence header to each of the plurality of packets.

13. The system of claim 9, wherein the communication mediums comprise: a satellite communication medium and a cellular communication medium; a satellite communication medium and a terrestrial cable communication medium; a cellular communication medium and a terrestrial cable communication medium; two different satellite communication mediums, two different cellular communication mediums; or two different terrestrial cable communication mediums.

14. The system of claim 9, the operations further comprising: before dividing the plurality of packets into the multiple sets of packets, placing, based on a total committed information rate (CIR) of a virtual link defining a virtual path of the plurality of communication links from the first communication device to the second communication device, the plurality of packets of the input data stream in one or more queues based on quality of service (QoS) conditions.

15. The system of claim 14, the operations further comprising: prior to concurrently transmitting the sets of packets, adding a sequence header to each of the plurality of packets, the sequence header comprising a sequence number identifying a QoS and the second communication device.

16. A method, comprising:
establishing, at a destination communication device, a virtual link between the destination communication device and a source communication device, the virtual link defining a virtual path of all communication links from the source communication device to the destination communication device;
storing parameters associated with the virtual link, the parameters comprising a committed information rate (CIR) for each of the communication links;
after establishing the virtual link and storing the parameters associated with the virtual link, receiving, at each of a plurality of receivers of the destination communication device, one or more signals transmitted over a respective communication link of the communication links from the source communication device to the destination communication device, each of the one or more signals including a set of frames transmitted over a respective communication medium by the source communication device, wherein each of the sets of frames is associated with a partition of a data stream, and the respective communication link is associated with the respective communication medium;
obtaining, at the destination communication device, a plurality of packets by extracting a packet from each frame of each of the sets of frames, the plurality of packets corresponding to multiple data streams having multiple respective qualities of service (QoS);
reading, at the destination communication device, a sequence header for each of the plurality of packets, the sequence header comprising a sequence number identifying the destination communication device and one of the QoS; and
based on the sequence numbers read from the plurality of packets, reordering, at the destination communication device, the plurality of packets into the multiple data streams having the multiple respective QoS.

17. A destination communication device, comprising:
a processor; and
a non-transitory computer-readable storage medium storing instructions that, when executed by the processor, cause the destination communication device to perform operations comprising:
establishing a virtual link between the destination communication device and a source communication device, the virtual link defining a virtual path of all communication links from the source communication device to the destination communication device;
storing parameters associated with the virtual link, the parameters comprising a committed information rate (CIR) for each of the communication links;
after establishing the virtual link and storing the parameters associated with the virtual link, receiving, at each of a plurality of receivers of the destination communication device, one or more signals transmitted over a respective communication link of the communication links from the source communication device to the destination communication device, each of the one or more signals including a set of frames transmitted over a respective communication medium by the source communication device, wherein each of the sets of frames is associated with a partition of a data stream, and the respective communication link is associated with the respective communication medium;
obtaining a plurality of packets by extracting a packet from each frame of each of the sets of frames, the plurality of packets corresponding to multiple data streams having multiple respective qualities of service (QoS);
reading a sequence header for each of the plurality of packets, the sequence header comprising a sequence number identifying the destination communication device and one of the QoS; and
based on the sequence numbers read from the plurality of packets, reordering the plurality of packets into the multiple data streams having the multiple respective QoS.

* * * * *